(No Model.) 2 Sheets—Sheet 1.
G. WARNER.
GATE.
No. 557,921. Patented Apr. 7, 1896.
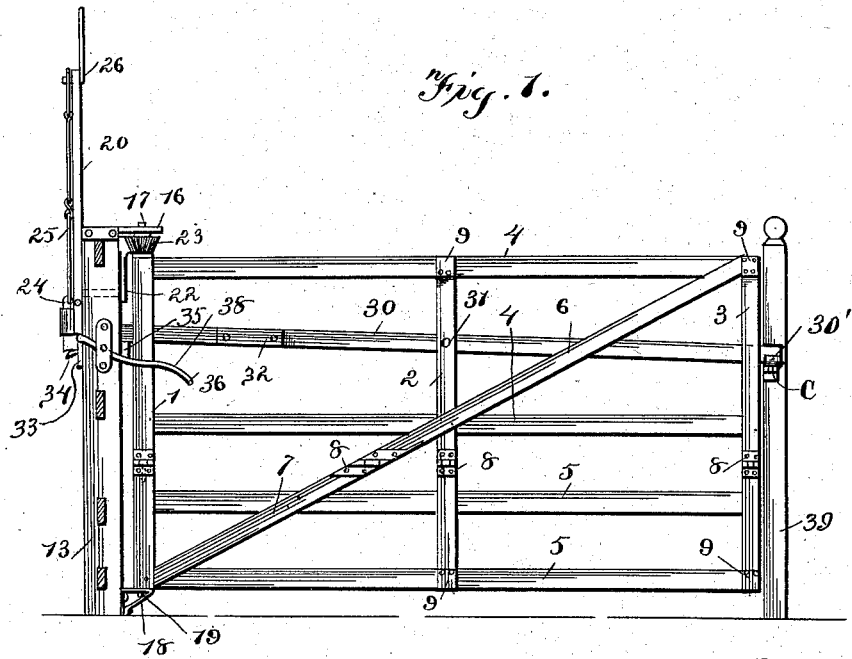
Fig. 1.
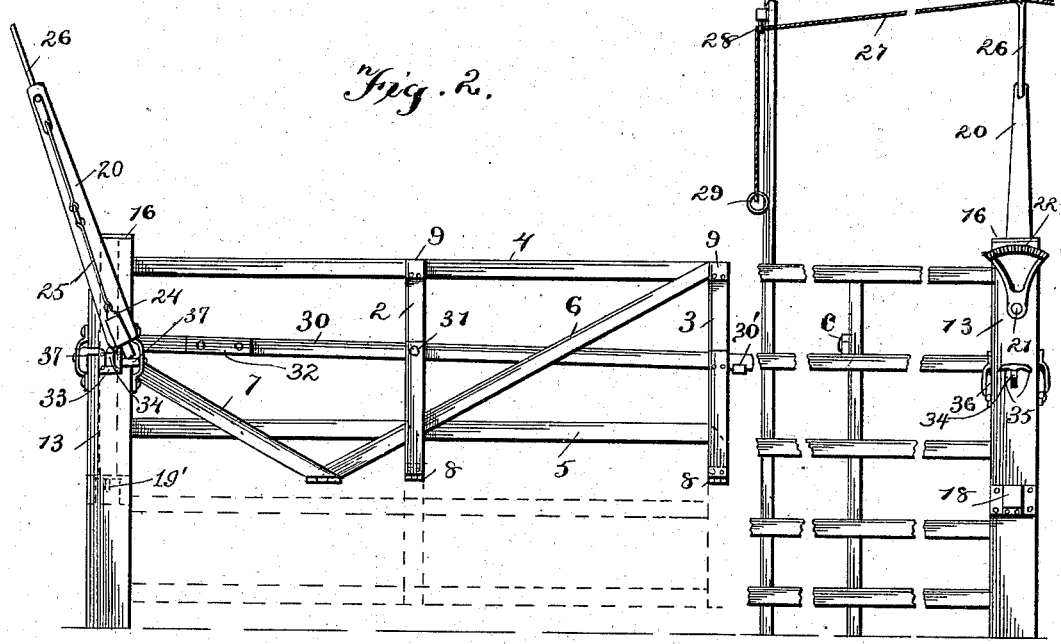
Fig. 2.
Fig. 3.
Witnesses:
Geo. E. Frech
J. H. Jochum Jr.
Inventor:
George Warner,
By his Attorneys
Collamer & Co.

(No Model.) 2 Sheets—Sheet 2.
G. WARNER.
GATE.
No. 557,921. Patented Apr. 7, 1896.
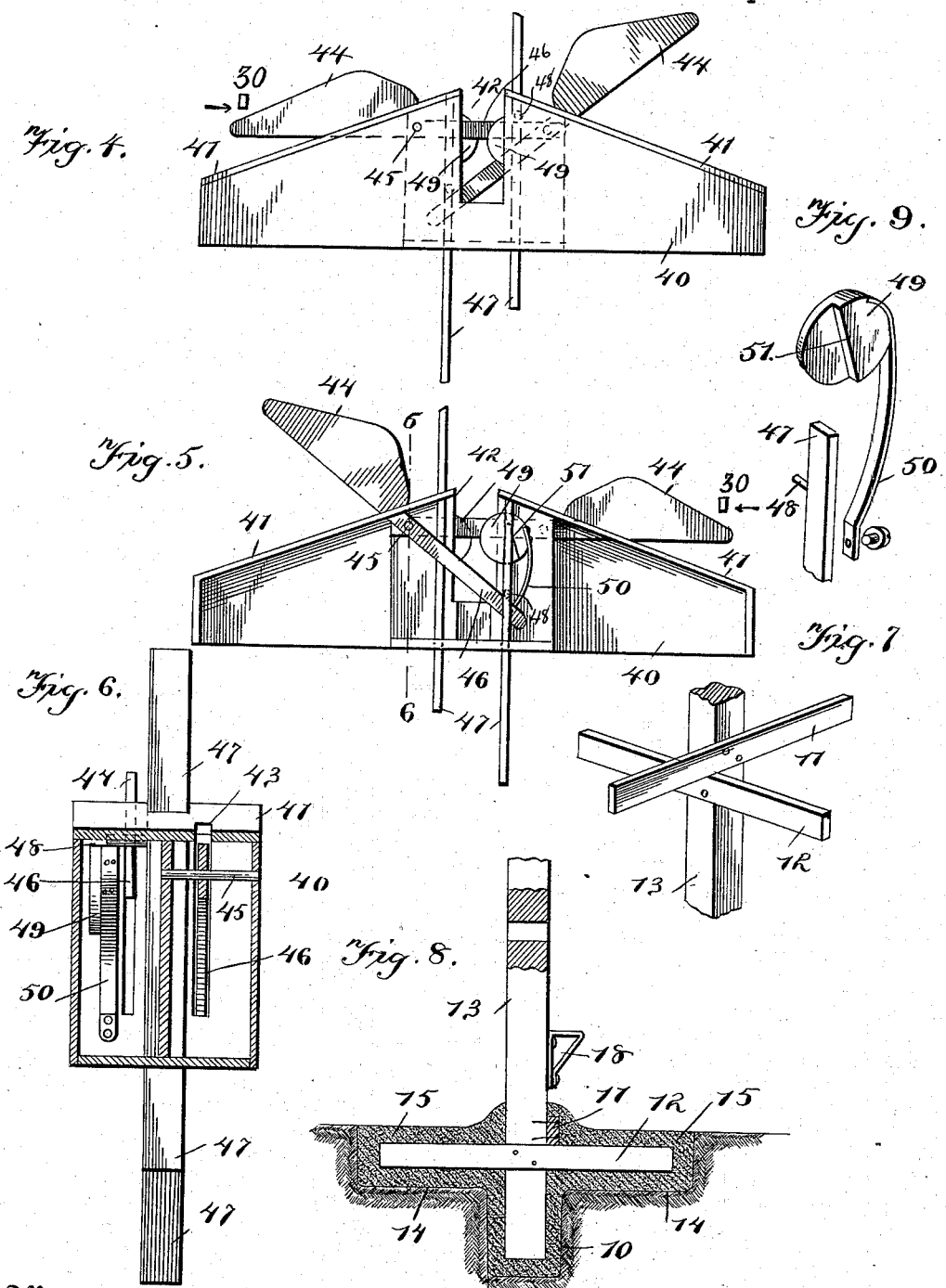

UNITED STATES PATENT OFFICE.

GEORGE WARNER, OF DEARBORN, MONTANA.

GATE.

SPECIFICATION forming part of Letters Patent No. 557,921, dated April 7, 1896.

Application filed March 4, 1895. Serial No. 540,562. (No model.)

*To all whom it may concern:*

Be it known that I, GEORGE WARNER, a citizen of the United States, and a resident of Dearborn, Lewis and Clarke county, State of Montana, have invented certain new and useful Improvements in Gates; and my preferred manner of carrying out the invention is set forth in the following full, clear, and exact description, terminating with claims particularly specifying the novelty.

This invention relates to gates, and more especially to such as are opened by hand, and the object of the same is to combine with the opening and closing mechanism a latch adapted to be operated automatically thereby before the gate is swung.

To this end the invention consists in the construction of the gate-swinging mechanism, of the latch-operating mechanism, and of the catch, and incidentally the invention also consists in certain improvements in the support for the hinge-post and the structure of the gate itself, all as hereinafter more fully described and claimed, and as illustrated in the drawings, wherein—

Figure 1 is a side elevation of this gate in its closed position, showing a section of the side fencing. Fig. 2 is a rear elevation of the hinge-post with the side fencing removed, showing the gate swung to its open position, and this view also illustrates how the lower portion of the gate-body may be turned on its hinges so as to swing over snow, &c. Fig. 3 is a front elevation of the hinge-post with the gate removed and the lower step adjusted to a suitable height to support the gate shown in Fig. 2, and this view also illustrates a portion of the side fencing and one of the catches thereon. Fig. 4 is an enlarged front elevation of the catch, showing one of the wings as depressed. Fig. 5 is a similar view of the catch with the front of its casing removed and the wings in their opposite position. Fig. 6 is a vertical section through the catch on the line 6 6 of Fig. 5. Fig. 7 is a perspective view of the lower end of the post. Fig. 8 is a section showing the manner of seating the post in the ground. Fig. 9 is a perspective detail showing one of the lugs with its beveled face and the upright rod with the pin that engages such face.

*The gate.*—The gate-body preferably consists of three or more upright members 1, 2, and 3, supporting horizontal members 4 4 and 5 5, although the precise construction of the gate is not essential to the operation of my invention. An oblique brace 6 and 7 is also preferably employed, which connects the upper end of the outermost upright 3 with the lower end of the innermost upright 1. The several uprights, as well as the oblique brace, are broken on a line shown in the drawings between the horizontal members 4 and 5, and the parts are connected by hinges 8, located all on one horizontal line, whereby when desired the lower portion of the gate is permitted to be turned up on this hinge-line, so that the whole may swing over snow of some depth or will allow the passage of small stock thereunder. The gate-body shown in the drawings is composed of five horizontal members, the second of which forms the latch, hereinafter described, and this hinge-line occurs between the third and fourth members. The parts are of the desired sizes and materials, and the gate might be of wire, pickets, or other suitable constructions adapted for the uses below; but when made as shown the connections between the several parts are preferably braced by cast malleable clips, as indicated at 9.

*The hinge-post.*—Figs. 7 and 8 illustrate my preferred manner of constructing and supporting the hinge-post, which carries the weight of the gate, and it will be understood that other posts connected with or remote from the gate may be mounted in the same manner, the object being to prevent tilting and sagging of the post, as well as to preserve its material for a long time. To this end a common post-hole 10 is dug in the ground, and two pieces of wood about two by six inches in size and from four to six feet in length, as numbered 11 and 12, are nailed or otherwise secured to the adjacent faces of the post 13 so as to stand in parallel horizontal planes, but in vertical planes at right angles to each other, and the projecting ends of these pieces or sills lie in trenches 14, dug in the ground and extending outward from the post-hole 10, their depth therein being such that they will stand just below the surface of the earth. I now make a strong plastic composition, as of Portland cement, mixed with coarse gravel and sand, pour the same into the bottom of the post-hole 10, set the post and plumb it, and finally fill up the post-hole and the trenches to a point sloping from the surface of the ground upward toward the body of the post. When this composition sets, it will be found that the embedded sills prevent the post from sagging and that the sweat of the cement will saturate the post and sills and will preserve them for a long time against the deleterious effects of dampness and chemicals in the earth. From the upper end of the post projects a plate 16, having a suitable eye, with which engages a pin 17 at the upper end of the inner upright 1 of the gate, and removably secured to the inner face of the post, beneath this plate 16, is a step 18, also having an eye adapted to receive a pin 19 in the lower end of this upright 1. When the lower portion of the gate is turned upward and secured in place, as shown in Fig. 2, this step 18 will be raised and secured to the post 13 at a somewhat higher point, as illustrated in Fig. 3, and the lower end of the upper section of the upright 1 will carry an additional pin 19' for engaging the eye in the step 18 at this time.

*The swinging mechanism.*—20 designates a lever whose pivot 21 is journaled in the post 13 and carries a toothed segment 22 on its inner end, the teeth of this segment engaging with a gear 23, rigidly mounted on the upper end of the inner upright 1 of the gate, just beneath the pin 17. Mounted on the lever 20, below its shaft 21, is a spring-actuated catch 24, from which rises a rod 25, extending along the rear face of the lever, and 26 is a crank journaled through the upper end of the lever, with its handle rising above the same and its opposite end connected with this rod. 27 are chains or cords extending to both sides of the handle of this crank, passing over pulleys or eyes 28, supported by remote posts in the side fencing, and carrying at their extremities rings or handles 29. By this construction it will be obvious that when one of the rings 29 is drawn upon it will first tip the crank 26 and retract the tip of the spring-actuated catch 24, and it will then tip the entire lever 20, and with it the segment 22, and the latter by being in mesh with the gear 23 will cause the gate to swing open on its pivots in a direction opposite from that in which the lever 20 is drawn. On the other hand, when the lever is returned to its upright position by a pull on the opposite ring 29 the gate will be again swung to its closed position; but in either direction in which the pull is exerted the first strain on the chain or cord 27 will be to turn the crank 26 in its bearings. The eyes or pulleys 28 may be supported by posts in the side fencing which are quite remote from the gate and may be high enough to permit of manipulation from a team or horseback; but the fact that the gate swings from the operator instead of toward him will in many instances permit him to come much nearer the gate before operating it than would otherwise be the case.

*The latch.*—The numeral 30 designates the latch-bar, which is preferably pivoted at 31 to the central upright member 2 of the gate-body and the opposite ends of which are permitted to rise and fall in slots in the endmost uprights 1 and 3, as will be clear, and whose extremities project beyond these uprights, the tip or free end of the latch, which engages the catch, being preferably provided with a small roller 30' for the purpose of avoiding friction, a weight 32 being secured to the inner arm of this latch-bar for the purpose of holding normally elevated the tip which projects beyond the outermost upright 3. Secured to the rear face of the post 13 is a U-shaped bracket 33, which stands directly beneath the lower end of the lever 21 when the latter is vertical, and the lower end of the spring-actuated catch 24 at this time projects into the opening in the center of this bracket. 34 is a trigger extending through the post and pivotally mounted between its ends therein, one extremity lying within the center of this bracket and the other extremity having laterally-projecting and curved arms 35, normally standing under the inner end of the latch-bar 30. 36 are fingers pivoted between their ends to opposite sides of the post 13, with their outer extremities 37 curving around behind the post and standing adjacent opposite edges of the bracket 33 and their inner extremities 38 passing astride the inner upright 1 of the gate-body and deflected downwardly, as shown. The letter C designates as a whole the catch which is supported by the catch-post 39, and *c* are ordinary catches carried by the side fencing. With this construction, the parts standing as seen in Fig. 1, a pull on one of the rings 29 first turns the crank 26 and raises the catch 24 out of the notch in the bracket 33, thus allowing the trigger 34 to turn on its pivot and its arms 35 to fall by reason of the weight 32, and hence the inner end of the latch 30 descends and its tip or outer end ascends and rises out of the catch C. A continued pull on the cord 27 then swings the gate in the manner above described, and when the inner end of the latch 30 passes off the arm 35 it strikes the deflected outer end 38 of one of the fingers 36, which, however, at this time stands depressed. At about the time that the tip of the latch 30 stands over the catch *c* in the side fencing the lever 20 has swung sufficiently far to carry the lower end of the spring-catch 24 over and completely out from the bracket 33, and the force of the spring then shoots the catch downward onto the outer end 37 of the finger 36, so that its inner end is suddenly raised. This causes the elevation of the inner end of the latch 30, and hence the sudden depression of the outer end or tip thereof and its engagement with the catch *c*. The operator then passes through, and, grasping the opposite ring, he pulls thereon to swing the lever 20 in the return direction and close the gate. At this time the first movement again lifts the catch 24, which releases the finger 36 and allows the latch 30 to fall at its inner end under the weight 32, so that its tip disengages the catch c, and a continued pull then swings the lower end of the lever inward over the bracket 33, closing the gate in the manner above described, and at the time that the gate reaches its closed position, with the tip of its latch over the main catch C, the spring-actuated catch 24 depresses the inner end of the trigger 34 and raises its outer end, so as to engage the tip of the latch with the catch in the post 39. It will be noticed that the operation of parts is positive to a great extent and that the use of the spring and the weight are but auxiliary. It should also be particularly observed, as above stated, that the gate always swings in a direction away from the person who is manipulating it.

*The catch.*—In such gates as are adapted to swing open in either direction from the catch-post (as 39 in the present drawings) a well-known objection lies in the fact that the latch of the gate very often indeed passes entirely over the catch without engaging it, especially if the gate be swung closed with some considerable force. The result is that the gate passes its closed position and swings partly or wholly open on the side opposite the catch-post, and the operator must either return and close the gate by hand or leave it standing ajar. In order to avoid this objection, I have constructed the catch best shown in Figs. 4, 5, and 6, and designated by the character C in the other views which illustrate it. This catch consists of a casing 40, whose upper faces 41 are inclined in both directions away from its central notch 42, so as to remove the possibility of their interfering with the action of the catch, and are provided with slots 43, as seen in Fig. 6. The halves of the casing at opposite sides of this notch are duplicates of each other, and hence a description of one will suffice for both. 44 is a wing extending through the slot 43 and mounted on a pivot 45 within the casing, its arm 46 at the other side of its pivot extending into and across the notch 42. 47 is an upright rod for this wing, which moves vertically in guides within the other half of the casing and at the opposite side of the notch 42, and this rod carries a pin 48, projecting laterally from it and resting on the arm 46 of the wing. 49 is a lug standing adjacent the rod 47 and having a rounded face projecting part way into the notch 42 from that side of the casing, and 50 is a spring supporting this lug and bearing it normally inward. The body of the lug within the casing has at one side of its inner face a bevel inclining outward from top to bottom, as at 51, so that when the rod 47 rises the pin 48 will engage this incline 51, bear the lug 49 inward against the tension of its spring, rise above the lug, and then permit the latter to spring outward, so as to support the pin 48, and with it the rod 47. With this construction the operation of the catch is as follows, the parts standing as shown in Fig. 4, wherein it is supposed that the gate shall swing closed from left to right: The tip of the latch 30, which cannot strike the incline 41, moves in the plane indicated by the arrow and rides over the left-hand wing 44, passes over the upper end of the notch 42, strikes forcibly against the upper end of the right-hand rod 47, and drops or is forced suddenly downward into the notch. In its downward movement it strikes the raised arm 46 of the left-hand wing 44 and depresses it, and it is of a proper width to pass between the rounded inner faces of both lugs 49 and press them outward, which action on the right-hand lug frees the pin 48 of the right-hand rod 47 and allows the latter to drop, so that both wings 44 now stand raised. The tip of the latch then falling into the notch cannot be dislodged. When the latch is raised to disengage it from the catch, it first rises out of the notch 42, and then moving, say, to the right it depresses the right-hand wing 44 as it passes over it and raises the left-hand rod 47, whose pin 48 passes up the bevel 51 in the left-hand lug 49 and presses said lug outward until it has passed above the lug, and the action of the left-hand spring 50 throws the lug inward beneath the pin, so that the parts then assume the position shown in Fig. 5, and on a return movement of the gate from right to left the engagement of the tip of the latch with the catch will take place in the manner above described, except that the gate will be swung in the opposite direction.

Many other details will suggest themselves to the manufacturer, and variations in the sizes, proportions, materials, and exact shape of parts, with such ornamentation and improvements as may be made, will form no departure from the essential principles of my invention. It is not essential that the gate-body shall have its lower portion hinged, though I consider this desirable for use upon farm-gates in cold or muddy climates. It is also not essential that this specific catch be used in connection with the specific gate-swinging mechanism above described; but I consider the catch a valuable addition to gates of this character or to any gate which is adapted to swing open in one of two directions. It is, moreover, not essential that the precise gate-swinging mechanism above mentioned shall be used in connection with the other parts; but I consider the details of its construction an improvement over those now on the market, and have therefore shown and described it as my preferred construction. Again, the specific construction of the hinge-post and its mounting in the ground may also be omitted, if desired, or may be used in connection with this gate or elsewhere, as preferred.

What is claimed as new is—

1. In a gate, the combination with the hinge-post, a plate projecting inward from its upper end and provided with an eye, and a step removably secured to the inner face of the post at various heights and also provided with an eye; of the gate-body comprising upright and horizontal members suitably connected, the upright members being broken near their lower ends, hinges standing in a horizontal line and connecting the sections of said members, pivotal pins in the upper and lower extremities of the innermost upright member, and an additional pivotal pin in the lower extremity of the upper section of the inner member, as and for the purpose set forth.

2. In a swinging gate, the combination with the gate-body having a gear on its innermost upright, a latch pivoted in the body and extending throughout the length thereof, a weight on this latch near its inner end, and a catch adapted to receive the tip of the latch; of a hinge-post supporting the gate, a shaft journaled through this post, a toothed segment on the shaft engaging said gear, an upright lever also mounted on the shaft, a spring-actuated catch mounted on the lever below its pivot, a trigger journaled through the post and having its outer end depressed by the catch when the lever is upright and its inner end at this time raising the inner end of the latch, a crank on the lever and connected with the catch thereon, and cords leading from the crank to remote posts in the side fencing, as and for the purpose set forth.

3. In a swinging gate, the combination with the gate-body having a gear on its innermost upright, a latch pivoted in the body and extending throughout the length thereof, a weight on this latch near its inner end, and a catch adapted to receive the tip of the latch; of a hinge-post supporting the gate, a shaft journaled through this post, a toothed segment on the shaft engaging said gear, an upright lever also mounted on the shaft, a spring-actuated catch mounted on the lever below its pivot, a trigger journaled through the post and having its outer end depressed by the catch when the lever is upright and its inner end at this time raising the inner end of the latch, a crank on the lever and connected with the catch thereon, cords leading from the crank to remote posts in the side fencing, fingers pivoted to opposite sides of the hinge-post with their outer ends bent behind the same and adapted to be depressed by said spring-actuated catch and their inner ends extending astride the inner upright of the gate and bent downwardly so as to raise the inner end of the latch when the gate is open, and catches on the side fencing at points to engage the tip of the latch, as and for the purpose set forth.

4. In a swinging gate, the combination with the gate-body having a gear on its innermost upright, a latch pivoted in the body and extending throughout the length thereof, a weight on this latch near its inner end, and a catch adapted to receive the tip of the latch; of a hinge-post supporting the gate, a shaft journaled through this post, a toothed segment on the shaft engaging said gear, an upright lever also mounted on the shaft, a spring-actuated catch on the lever below its pivot, a trigger journaled through the post and having its outer end depressed by the catch when the lever is upright and its inner end at this time raising the inner end of the latch, a U-shaped bracket on the rear face of the post whose notch receives the outer end of the trigger and the tip of the catch, a crank on the lever and connected with the catch thereon, cords leading from the crank to remote posts in the side fencing, fingers pivoted to opposite sides of the hinge-post with their outer ends bent behind the same to points adjacent the edges of the bracket and adapted to be depressed by said spring-actuated catch, and their inner ends extending astride the inner upright of the gate and bent downwardly so as to raise the inner end of the latch when the gate is open, as and for the purpose set forth.

5. In a swinging gate, the combination with the latch-post carrying a catch, the hinge-post, the gate-body connected with the latter, a pivoted latch in said body extending the length thereof with its tip standing normally raised, an upright lever connected with the hinge-post, and connections between the lever and gate for swinging the latter when the former is deflected; of a spring-actuated catch on the lever below its pivot, a trigger journaled through the post and having its outer end depressed by the catch when the lever is upright and its inner end at this time raising the inner end of the latch, a U-shaped bracket on the rear face of the post whose notch receives the outer end of the trigger and the tip of the catch, a crank on the lever and connected with the catch thereon, cords leading from the crank to remote posts in the side fencing, fingers pivoted to opposite sides of the hinge-post with their outer ends bent behind the same to points adjacent the edges of the bracket and adapted to be depressed by said spring-actuated catch, and their inner ends extending astride the inner upright of the gate and bent downwardly so as to raise the inner end of the latch when the gate is open, as and for the purpose set forth.

6. In a swinging gate, the combination with the latch-post carrying a catch, the hinge-post, the gate-body connected with the latter, a pivoted latch in said body extending the length thereof with its tip standing normally raised, an upright lever connected with the hinge-post, and connections between the lever and gate for swinging the latter when the former is deflected; of a spring-actuated catch mounted on the lever below its pivot, a trigger journaled through the post and having its outer end depressed by the catch when the lever is upright and its inner end at this time raising the inner end of the latch, a crank on the lever and connected with the catch thereon, cords leading from the crank to remote posts in the side fencing, fingers pivoted to opposite sides of the hinge-post with their outer ends bent behind the same and adapted to be depressed by said spring-actuated catch and their inner ends extending astride the inner upright of the gate and bent downwardly so as to raise the inner end of the latch when the gate is open, and catches on the side fencing at points to engage the tip of the latch, as and for the purpose set forth.

7. In a swinging gate, the combination with the latch-post carrying a catch, the hinge-post, the gate-body connected with the latter, a pivoted latch in said body extending the length thereof with its tip standing normally raised, an upright lever connected with the hinge-post, and connections between the lever and gate for swinging the latter when the former is deflected; of a spring-actuated catch mounted on the lever below its pivot, a trigger journaled through the post and having its outer end depressed by the catch when the lever is upright and at its inner end having laterally-inclined arms which at this time raise the inner end of the latch, a crank on the lever and connected with the catch thereon, and cords leading from the crank to remote posts in the side fencing, as and for the purpose set forth.

8. In a gate adapted to swing two ways when in closed position, the combination with the gate-body, means for swinging it in either direction, a latch projecting beyond the free end of the gate, and means for raising the tip of this latch; of a catch consisting of a casing having a central notch, upright rods sliding in guides at opposite sides of the notch and each having a laterally-projecting pin, and a wing for each rod pivoted in the half of the casing opposite that containing the rod with its body rising through a slot in that half of the casing and its arm projecting across the notch and standing beneath said pin, as and for the purpose set forth.

9. In a gate adapted to swing two ways when in closed position, the combination with the gate-body, means for swinging it in either direction, a latch projecting beyond the free end of the gate, and means for raising the tip of this latch; of a catch consisting of a casing having a central notch, upright rods sliding in guides at opposite sides of the notch and each having a laterally-projecting pin, a lug standing adjacent each rod and having a rounded face, a spring supporting the lug and projecting said face normally part way into the notch, the body of the lug having a bevel adapted to permit the rise but to prevent the fall of said pin, and means for raising either rod as the tip of the latch passes away from it, as and for the purpose set forth.

10. In a gate adapted to swing two ways when in closed position, the combination with the gate-body, means for swinging it in either direction, a latch projecting beyond the free end of the gate, and means for raising the tip of this latch; of a catch consisting of a casing having a central notch, upright rods sliding in guides at opposite sides of the notch and each having a laterally-projecting pin, and a wing for each rod pivoted in the half of the casing remote from that containing the rod with its body rising through a slot in the top of the casing and its arm on the opposite side of the pivot standing under said pin, as and for the purpose set forth.

11. In a gate adapted to swing two ways when in closed position, the combination with the gate-body, means for swinging it in either direction, a latch projecting beyond the free end of the gate, and means for raising the tip of this latch; of a catch consisting of a casing having a central notch, upright rods sliding in guides at opposite sides of the notch and each having a laterally-projecting pin, a lug standing adjacent each rod and having a rounded face, a spring supporting the lug and projecting said face normally part way into the notch, and means for raising either rod as the tip of the latch passes away from it, as and for the purpose set forth.

In testimony whereof I have hereunto subscribed my signature on this the 24th day of January, A. D. 1895.

GEORGE WARNER.

Witnesses:
MARY F. BILLINGS,
LOUISE BILLINGS.